United States Patent
Aguirre Vargas et al.

(10) Patent No.: US 10,519,271 B2
(45) Date of Patent: Dec. 31, 2019

(54) EPOXY COMPOSITION CONTAINING ACRYLATE BASED TOUGHENING AGENT

(71) Applicant: Dow Global Technologies LLC, Midland, MI (US)

(72) Inventors: Fabio Aguirre Vargas, Lake Jackson, TX (US); William H. Heath, Lake Jackson, TX (US); William L. Heaner, IV, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/328,103

(22) PCT Filed: Oct. 8, 2015

(86) PCT No.: PCT/US2015/054614
§ 371 (c)(1),
(2) Date: Jan. 23, 2017

(87) PCT Pub. No.: WO2016/060923
PCT Pub. Date: Apr. 21, 2016

(65) Prior Publication Data
US 2017/0218111 A1    Aug. 3, 2017

Related U.S. Application Data

(60) Provisional application No. 62/063,081, filed on Oct. 13, 2014.

(51) Int. Cl.
| | |
|---|---|
| C08G 18/67 | (2006.01) |
| C08G 18/48 | (2006.01) |
| C08G 18/76 | (2006.01) |
| C09D 163/00 | (2006.01) |
| C09D 175/16 | (2006.01) |
| C08G 59/22 | (2006.01) |
| C08G 59/24 | (2006.01) |
| C08G 18/10 | (2006.01) |
| C08G 18/66 | (2006.01) |
| C09D 5/00 | (2006.01) |
| C09D 5/08 | (2006.01) |
| C09D 175/08 | (2006.01) |

(52) U.S. Cl.
CPC .......... *C08G 18/672* (2013.01); *C08G 18/10* (2013.01); *C08G 18/4825* (2013.01); *C08G 18/4866* (2013.01); *C08G 18/6666* (2013.01); *C08G 18/7621* (2013.01); *C08G 59/226* (2013.01); *C08G 59/245* (2013.01); *C09D 5/00* (2013.01); *C09D 5/08* (2013.01); *C09D 163/00* (2013.01); *C09D 175/08* (2013.01); *C09D 175/16* (2013.01)

(58) Field of Classification Search
CPC ......... C08G 18/02; C08G 18/10; C08G 59/50
See application file for complete search history.

(56) References Cited

U.S. PATENT DOCUMENTS

| | | | |
|---|---|---|---|
| 5,232,996 A | 8/1993 | Shah et al. | |
| 5,578,693 A | 11/1996 | Hagstrom et al. | |
| 6,660,805 B1 | 12/2003 | Righettini et al. | |
| 8,829,122 B2 | 9/2014 | Kramer et al. | |
| 2003/0192643 A1* | 10/2003 | Schoenfeld | C08G 18/672 |
| | | | 156/330 |
| 2004/0229990 A1 | 11/2004 | Righettini et al. | |
| 2007/0298201 A1* | 12/2007 | Laborbe | C08L 53/00 |
| | | | 428/36.8 |
| 2011/0030893 A1* | 2/2011 | Kramer | C08G 18/10 |
| | | | 156/281 |
| 2012/0211161 A1 | 8/2012 | Lutz et al. | |

FOREIGN PATENT DOCUMENTS

WO    2003078163 A1    9/2003

OTHER PUBLICATIONS

Swiderski, et al, "Synthesis and Properties of Urethane Acrylate Oligomers: Direct versus Reverse Addition", Ind. Eng. Chem. Res. 2004, 43, 6281-6284.
PCT/US2015/054614,; International Search Report and Written Opinion of the International Searching Authority dated Jan. 7, 2016.
PCT/ US2015/054614, International Preliminary Report on Patentability dated Apr. 18, 2017.

* cited by examiner

Primary Examiner — Kuo Liang Peng

(57) ABSTRACT

A curable composition includes (A) a first component having from 5.0 wt % to 39.0 wt %, based on the total weight of the first component, of a toughening agent component including a Bisphenol F based epoxy resin and an urethane acrylate component, a hardener component having at least one amine based hardener and is present in a ratio of 0.8 to 1.2, based on a number of equivalents of amino hydrogen groups in the hardener component to a number of equivalents of reactive groups in the first component capable of forming a covalent link with the amine reactive groups in the hardener, and an epoxy base component that accounts for a remainder of the total weight of the first component and that has at least one epoxy resin separately provided from the Bisphenol F based epoxy resin. The Bisphenol F based epoxy resin is present in an amount from 2.5 wt % to 50.0 wt % and the urethane acrylate component is present in an amount from 50.0 wt % to 97.5 wt %, based on the total weight of the toughening agent component. The urethane acrylate component includes the capping reaction product of an acrylate and an isocyanate terminated prepolymer and the isocyanate-terminated prepolymer is the reaction product of a polyisocyanate and at least a DMC derived polyol having a molecular weight of at least 3000 g/mol. The curable composition may further include (B) an optional second component that has at least one of a filler and any additional ingredient for a targeted application of the curable composition.

12 Claims, 1 Drawing Sheet

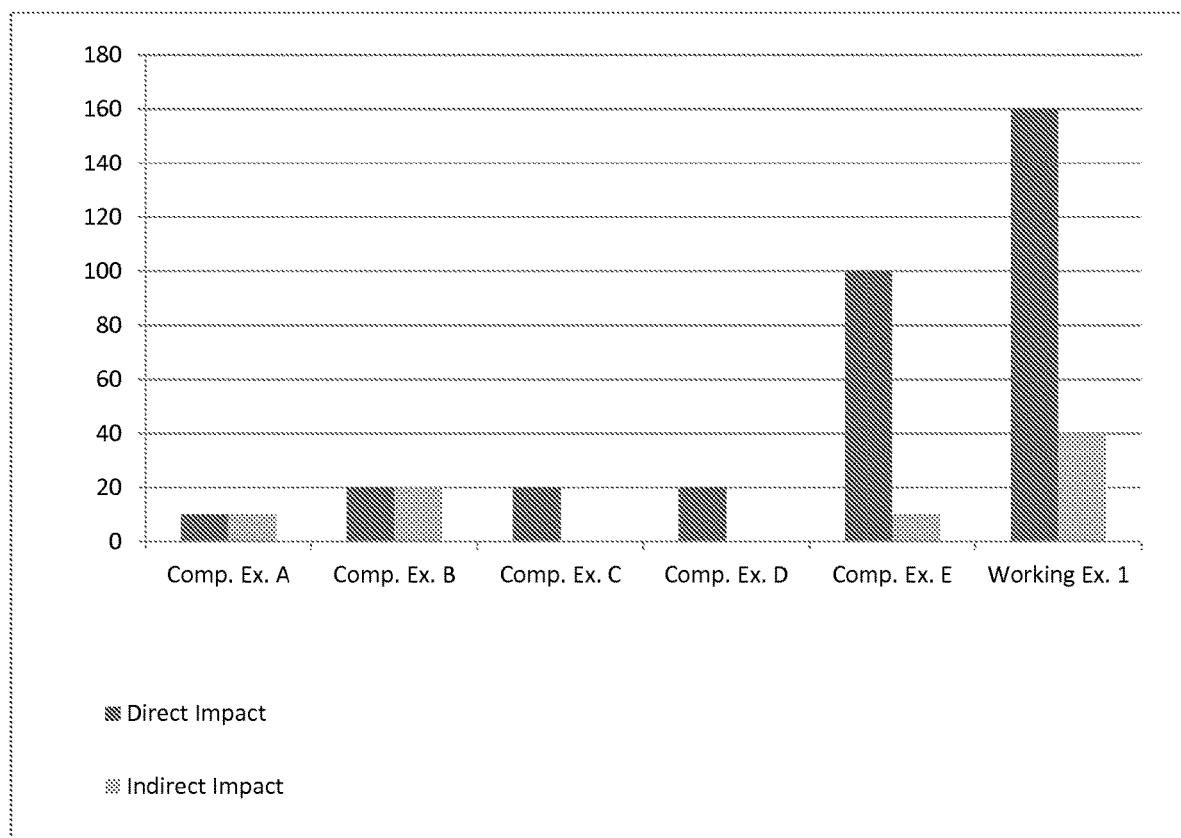

EPOXY COMPOSITION CONTAINING ACRYLATE BASED TOUGHENING AGENT

FIELD

Embodiments relate to an urethane acrylate and epoxy blend formulation for improving flexibility and/or impact resistance of epoxy resin based coatings.

INTRODUCTION

Epoxy resins are used in various applications including coatings. However, epoxy resin-based coating systems, especially those from high to 100% solids content, have some performance and application limitations. Firstly, the epoxy resin-based systems may be too rigid and brittle for certain intended application (e.g., pipes, cargo holds, tanks, etc.) where long term corrosion resistance is sought at ambient and subzero temperatures and where damage tolerant (such as flexibility, impact resistance, and abrasion resistance) characteristics are sought to avoid frequent and costly repairs (e.g., of the coating). Secondly, the viscosity of the epoxy resin-based systems may be too high so as precluding application by rolling or necessitating heating of the components for easy spray applications. Accordingly, it would be desirable to provide modified epoxy-resin based systems that are usable for forming coatings and that avoid and/or minimize the issues discussed above.

SUMMARY

Embodiments may be realized by providing a curable composition that includes (A) a first component having from 5.0 wt % to 39.0 wt %, based on the total weight of the first component, of a toughening agent component including a Bisphenol F based epoxy resin and an urethane acrylate component, a hardener component having at least one amine based hardener and is present in a ratio of 0.8 to 1.2, based on a number of equivalents of amino hydrogen groups in the hardener component to a number of equivalents of reactive groups in the first component capable of forming a covalent link with the amine reactive groups in the hardener, and an epoxy base component that accounts for a remainder of the total weight of the first component and that has at least one epoxy resin separately provided from the Bisphenol F based epoxy resin. The Bisphenol F based epoxy resin is present in an amount from 2.5 wt % to 50.0 wt % and the urethane acrylate component is present in an amount from 50.0 wt % to 9.75 wt %, based on the total weight of the toughening agent component. The urethane acrylate component includes the capping reaction product of an acrylate and an isocyanate terminated prepolymer and the isocyanate-terminated prepolymer is the reaction product of a polyisocyanate and at least a DMC derived polyol having a molecular weight of at least 3000 g/mol. The curable composition may further include (B) an optional second component that has at least one of a filler and any additional ingredient for a targeted application of the curable composition.

BRIEF DESCRIPTION OF THE DRAWINGS

FIG. 1 illustrates a graphical representation of impact resistance for the Working and Comparative Examples.

DETAILED DESCRIPTION

An epoxy composition may include at least a base epoxy component (e.g., a Bisphenol A based epoxy resin or a NOVOLAC epoxy resin) and a hardener component (e.g., an amine based hardener/curing agent and/or other optional additives that are known in the art). The epoxy composition includes a toughening agent to improve coating flexibility and impact resistance, e.g., as discussed in U.S. Pat. No. 5,334,654. In embodiments, a toughening agent component is separate and different from a hardener component and an epoxy base component. The toughening agent has functional groups that under the conditions of the curing reaction react with a hardener in the epoxy composition. According to embodiments, the toughening agent component includes an urethane acrylate component that includes at least one urethane acrylate derived from at least one polyol, of which at least one polyol is synthesized using a double metal cyanide (DMC) catalyst and optional additional polyols may be included that are prepared using non-DMC catalysts such as conventional catalysts known to one skilled in the art. For example, the urethane acrylate is derived from a polyol component that includes at least 75 wt % (based on a total weight of the polyol component) of at least one polyol that is synthesized using a DMC based catalyst and any optional remainder of the polyol component includes at least one polyol that is derived from a non-DMC catalyst such as synthesized using a alkali metal hydroxide and/or alkali metal methoxide based catalyst. In embodiments, the toughening agent component includes a Bisphenol F based epoxy component to reduce viscosity and/or enhance the damage tolerant characteristic of the coatings. The toughening agent component is distinguishable and/or separately provided from the base epoxy component.

The epoxy composition may be formulated into a two-part formulation, where a hardener is packaged separately from the epoxy-functional materials, and the two components are mixed together at the time (or just before) of application of the materials. In an exemplary two-part formulation, the toughening agent component may be separately stored from an epoxy base component and/or a hardener component. For example, the toughening agent component may be mixed with the epoxy-functional materials just before application of the materials. The epoxy component is a curable composition that may be used to form a coating and/or adhesive layer.

Toughening Agent Component

According to embodiments, the toughening agent component includes a Bisphenol F based resin (e.g., one or more Bisphenol F based resins) and an urethane acrylate component (e.g., one or more urethane acrylates). The toughening agent component accounts for 5.0 wt % to 39.0 wt % (e.g., from 5.0 wt % to 30 wt %, from 5.0 wt % to 25 wt %, from 5.0 wt % to 20 wt %, from 5.0 wt % to 15 wt %, and/or from 5.0 wt % to 10 wt %) of a total weight of a first component, which first component includes the toughening agent component, the hardener component, and the epoxy base component. Based on the total weight of the toughening agent component, the Bisphenol F based epoxy resin is present in an amount from 2.5 wt % to 50.0 wt % (e.g., 10.0 wt % to 50.0 wt %, 20.0 wt % to 50.0 wt %, 30.0 wt % to 45.0 wt %, 35.0 wt % to 45.0 wt %, and/or 39.0 wt % to 43.0 wt %) from and the urethane acrylate component is present in an amount from 50.0 wt % to 97.5 wt % (e.g., 50.0 wt % to 90.0 wt %, 50.0 wt % to 80.0 wt %, 50.0 wt % to 70.0 wt %, 50.0 wt % to 65.0 wt %, 55 wt % to 65 wt %, and/or 59 wt % to 63 wt %).

By Bisphenol F based epoxy resin, it is mean any epoxy resin that includes or is derived from Bisphenol F (including the diglycidyl ether of Bisphenol F). For exemplary, the Bisphenol F based epoxy resin may be a Bisphenol F (or Bisphenol F derived) epoxy resin that is known in the art and/or classified as a Bisphenol F epoxy resin by a person skilled in the art. The Bisphenol F based epoxy resin may have a nominal epoxide functionality of 2.0. In exemplary embodiments, the toughening agent component may include 80 wt % or less of the Bisphenol F based resin, based on the total weight of the toughening agent component. For example, the weight ratio of the Bisphenol F based resin and the urethane acrylate component may be from 20:80 to 50:50, 35:65 to 50:50, and/or 37:63 to 50:50. The amount of the urethane acrylate component may be greater than the amount of Bisphenol F based epoxy component. In an exemplary embodiment, the amount by weight of the urethane acrylate component is from 1.25 to 1.75 times greater than the amount by weight of the Bisphenol F based component.

The urethane acrylate component includes at least one urethane acrylate derived from a polyol component that includes at least a polyol that is synthesized using a double metal cyanide (DMC) catalyst. The urethane acrylate derived from the polyol component may account for 90 wt % to 100 wt % of the total weight of the urethane acrylate component, and any optional remainder may be another urethane acrylate (such as one not derived from the polyol component that includes at least one DMC catalyst derived polyol). In an exemplary embodiment, the toughening agent component may consistent essentially of at least urethane acrylate component blended with the Bisphenol F based resin (which can be one or more Bisphenol F based resins). The toughening agent component may optionally include a carboxyl group-containing acrylonitrile-butadiene, core shell rubber, self-assembling block copolymers and/or a non-urethane derived toughening agent that is known in the art for use in epoxy compositions.

In exemplary embodiments, the urethane acrylate in the toughening agent may account for 2.5 wt % to 19.5 wt % of a total weight of a dry coating film prepared using the curable composition (which total dry weight includes no volatile organic compounds, the epoxy base component, the hardener component, the entirety of the toughening agent component, and any other optional ingredients that are included). For example, the urethane acrylate in the toughening agent component may account for 3 wt % to 19 wt %, 5 wt % to 19 wt %, and/or 15 wt % to 18 wt % of the total weight of the dry coating film.

The urethane acrylate component includes the capping reaction product of an acrylate (one or more acrylates) and an isocyanate-terminated prepolymer component, whereas the isocyanate-terminated prepolymer component is the reaction product of a polyisocyanate (one or more polyisocyanate) and the polyol component that includes at least a polyol having a molecular weight of at least 3000 g/mol. For example, the urethane acrylate is the reaction product of a polyurethane based prepolymer, e.g., derived from a polyisocyanate and at least a polyol that is synthesized using only DMC based catalysts so as to form an isocyanate-terminated prepolymer, which has undergone acrylate capping. In addition to the DMC derived polyol, the reaction mixture for forming the polyurethane based prepolymer may include at least one other polyol (e.g., the DMC derived polyol may constitute a majority of greater than 75 wt % of the total amount of polyol(s) used with the optional remainder being another polyether polyol, polyester polyol, and/or a polyamine). The polyurethane based prepolymer is the reaction product of the polyol used to form the urethane acrylate and a polyisocyanate (such as diisocyanates that are known in the polyurethane art, which includes pure, polymeric, and modified forms of toluene diisocyanate—TDI and diphenylmethylene diisocyanate-MDI). According to an exemplary embodiment, the polyisocyanate is monomeric TDI or MDI (e.g., a blend of 2,2 and 2,6 isomers of TDI or 2,2 and 2,4 isomers of MDI) that has a nominal isocyanate functionality of at least 2.

The polyurethane based prepolymer may be formed in the presence of a catalyst, such as a tin-based catalyst and/or an amine-based catalyst that is known in the art. The polyurethane based prepolymer may be formed to have a free NCO (i.e., free isocyanate moiety) content of from 1 wt % to 7 wt % (e.g., 1 wt % to 5 wt %), based on the total weight of the resultant polyurethane based prepolymer.

The polyol component used to form the urethane acrylate (by way of forming the polyurethane based prepolymer) includes at least one polyol that has a high molecular weight of greater than 3000 grams/mole and is derived from a DMC catalyst. For example, the polyol component includes at least 75 wt % of polyol(s) having a molecular weight of greater than 3000 grams/mole and derived from a DMC catalyst, based on the total weight of the polyol component, and any optional remainder may be polyol(s) having a molecular weight of greater than 3000 grams/mole and derived from a non-DMC catalyst or may be polyol(s) having a molecular weight of less than 3000 grams/mole and derived from a non-DMC catalyst. For example, the polyol(s) (as derived from a DMC catalyst or a non-DMC catalyst) may have a molecular weight greater than 3000 grams/mol and less than 10000 grams/mol.

The polyols(s), such as the at least one polyol that has a molecular weight of greater than 3000 grams/mole and is derived from a DMC catalyst, may have a low level of unsaturation such that the polyol has a degree of unsaturation that is less than 0.100 meq/g polymer. The level of unsaturation for the polyol(s) may be less than 0.050 meq/g polymer, less than 0.020 meq/g polymer, and/or less than 0.015 meq/g polymer. The polyol(s) may have a low monol content, e.g., less than 3.0 wt % to an unmeasurably low amount, based on the total weight of the polyol component used to form the urethane acrylate. Further, the polyol(s) may have both a high molecular weight and a low polydispersity (Mw/Mn). For example, the polydispersity may be from 1.0 to 1.2.

In embodiments, at least one polyol used to form the urethane acrylate is not derived from an alkali metal hydroxide and/or alkali metal methoxide based catalyst. In particular, the least one polyol may be derived only from a DMC based catalyst (and may not be derived from a KOH based catalyst or other alkali metal hydroxides and/or alkali metal methoxide based catalysts). Polyoxypropylene including polyols produced with a KOH based catalyst, may lead to conversion of hydroxyl end-groups to vinyl groups that are unreactive to conventional coupling reactions. For example, during conventional base catalyzed oxypropylation, a competing rearrangement of propylene oxide into allyl alcohol continually generates an oxyalkylatable unsaturated monol during the course of the reaction. The polyoxyalkylation of this monomeric species may produce monols of broad molecular weight range, which increase polydispersity and decrease the overall functionality of the resultant product. Further, high molecular weight polyols produced with a KOH based catalyst may have a high level of unsaturation, e.g., of greater than 0.15 meq/g polymer. In contrast, high molecular weight polyols produced with a DMC based catalyst may have a lower level of unsaturation, e.g., of less than 0.01 meq/g polymer. This could equate to 28% versus 2% of unreactive end-groups on KOH based catalyst vs. DMC based catalyst derived polyols respectively.

The polyurethane based prepolymer is capped with acrylate(s) to form the urethane acrylate, according to embodiments. The acrylate capping reaction may be performed in the presence of a catalyst, such as a tin-based catalyst and/or an amine-based catalyst that is known in the art. The urethane acrylate may contain urethane groups (and optionally urea groups in which the inclusion of such groups is known in the art) derived from the polyurethane based prepolymer (that is has isocyanate terminated groups), at least 90% of which are capped with an acrylate compound. Acrylate compounds may be understood as including an acrylate ion that has the following molecular formula:

$$CH_2=CHCOO^-$$ Formula 1

The acrylate capping of the polyurethane based prepolymer may be performed after the polyurethane based prepolymer is formed. Exemplary acrylates include hydroxyethyl acrylate, hydroxyethyl methacrylate, hydroxypropyl acrylate, and hydroxypropyl methacrylate.

For example, the polyurethane based prepolymer is the reaction product of a polyisocyanate and the polyol derived from a DMC based catalyst. The urethane acrylate may be the reaction product of the polyurethane based prepolymer and at least one acrylate. For example, the urethane acrylate may be prepared as the reaction product of a terminally unsaturated isocyanate containing polyurethane oligomer and an alkoxylated polyhydric alcohol, e.g., as discussed in U.S. Pat. No. 5,578,693. The terminally unsaturated isocyanate containing polyurethane oligomer may be prepared by reacting at least one polyisocyanate with at least one polyol to form an isocyanate terminated prepolymer, reacting a portion of the unreacted terminal isocyanate groups with at least one hydroxyl-functional acrylate or hydroxyl-functional vinyl ether to form a terminally unsaturated isocyanate-containing urethane oligomer, and reacting the remaining terminal isocyanate groups with at least one alkoxylated polyhydric alcohol, as discussed in U.S. Pat. No. 5,578,693.

Hardener Component

The hardener component includes at least one amine based hardener and is present in a ratio of 0.8 to 1.2, based on a number of equivalents of amino hydrogen groups in the hardener component to a number of equivalents of reactive groups in the first component capable of forming a covalent link with the amine reactive groups in the hardener component. The concentration may be measured as an equivalent ratio of (amino hydrogen NH):(combination of epoxy functionality and acrylate functionality, i.e., reactive groups in the first component capable of forming a covalent link with amine reactive groups) as being from 0.8:1.0 to 1.2:1.0 (e.g., 0.9:1.0 to 1.2:1.0, 0.8:1.0 to 1.2:1.0, 0.8:1.0 to 1.1:1.0, etc.). In an exemplary embodiment, the hardener component may account for 15 wt % to 45 wt % of the total weight of the formulation that includes the toughening agent component, the epoxy base component, and the hardener component. For example, hardener component may be present in an amount 15 wt % to 45 wt %, with the remainder being the toughening agent and the epoxy base component.

Exemplary materials for use in the hardener component include an ethylene amine, a cycloaliphatic amine, a Mannich base, an amidoamine, a polyamide, a phenalkamine, and mixtures thereof. Example hardeners may be based on isophorone diamine, bisaminomethylcyclohexane, bis(aminocyclohexyl)methane, metaxylene diamine, diaminocyclohexane, and ethyleneamines; adducts of any one or more of the aforementioned amines with epoxy resins; amides of any one or more of the aforementioned amines with fatty acids and dimer acids; Mannich bases of any one or more of the aforementioned amines; and mixtures thereof.

Examples of optional other curing agents, different from the amine curing agent, that may be present include any of the co-reactive or catalytic curing materials known to be useful for curing epoxy resin based compositions. Such co-reactive curing agents include, e.g., polyamine, polyamide, polyaminoamide, dicyandiamide, polymeric thiol, polycarboxylic acid and anhydride, and any combination thereof or the like. Exemplary catalytic curing agents include tertiary amines; quaternary ammonium halides; quaternary phosphonium halides or carboxylates; Lewis acids such as boron trifluoride; and any combination thereof or the like. Other specific examples of co-reactive curing agents include diaminodiphenylsulfone, styrene-maleic acid anhydride (SMA) copolymers; and any combination thereof. Among the conventional co-reactive epoxy curing agents, amines and amino or amido containing resins and phenolics are preferred.

Epoxy Base Component

The epoxy base component accounts for a remainder of the total weight (based on a total of 100 wt %) of the toughening agent component, the hardener component, and the epoxy base component. The epoxy base component is separately provided from the Bisphenol F based resin in the toughening agent component, e.g., the epoxy base component may include at least one epoxy resin different from the Bisphenol F based epoxy resin. For example, the epoxy base component may account for 20 wt % to 80 wt % (e.g., 40 wt % to 60 wt %) of the total weight of the formulation that includes the toughening agent component, the epoxy base component, and the hardener component. The epoxy base component may only include liquid epoxy resins.

The epoxy base component may include an aromatic or aliphatic based epoxy resin (e.g., derived as glycidyl ethers), cycloaliphatic epoxy resin, and/or a divinylarene dioxide such as divinylbenzene dioxide. For example, the epoxy base component may include at least one epoxy resin based on the reaction product of: (1) a polyfunctional compound of an alcohol, a phenol, a cycloaliphatic carboxylic acid, an aromatic amine, or an aminophenol; and (2) an epihalohydrin such as for example an epichlorohydrin. A few non-limiting embodiments include, e.g., bisphenol A diglycidyl ether, resorcinol diglycidyl ether, and triglycidyl ethers of para-aminophenols. The epoxy base component is different from the Bisphenol F based epoxy component in the toughening agent, e.g., in exemplary embodiments the components in the epoxy base component may not be derived from Bisphenol F.

Exemplary materials for use in the epoxy base component include, e.g., reaction products of epichlorohydrin with o-cresol novolacs, hydrocarbon novolacs, and phenol novolacs. Other exemplary materials include a liquid epoxy resin (LER) such as a liquid bisphenol A (BPA) based epoxy resin, an advanced bisphenol A based epoxy resin, a fatty acid modified epoxy resin, a dimer acid advanced epoxy resin, a cardanol modified epoxy resin, a cardol advanced epoxy resin, epoxy novolac resins, epoxy cresol novolac resins, resorcinol epoxy resins, other aromatic epoxy resins, and rubber modified epoxy resins, and mixtures thereof. Exemplary commercially available materials for use in the epoxy base component include, e.g., D.E.R.™330, D.E.R.™331, D.E.R.™332, D.E.R.™337, D.E.R.™383, or D.E.N.™ 425, available from The Dow Chemical Company (D.E.R. and D.E.N are trademarks of The Dow Chemical Company.)

Optional Ingredients

The curable composition may include an optional second component that includes filler(s) and/or any additional ingredient(s) for a targeted application of the curable composition. Exemplary filler(s) include organic filler(s) and inorganic filler(s). For example, the filler(s) may be filler(s) that are known in the art for use in targeted applications that include, e.g., forming a clear coat, forming an adhesive layer, and other targeted applications known in the art for epoxy compositions. For example, the filler may include calcium carbonate, silicon powder, talc powder, and/or silica. Any additional ingredient(s) (which is dependent on the targeted application that includes, e.g., as a clear coat, as an adhesive layer, and as other targeted applications known in the art for epoxy compositions) include the following: flow modifiers, pigments, adhesion promoters, and other additives known to those skilled in the art of formulating epoxy coatings. Any additional ingredients may include other optional compounds that may be added to the formulation such as a catalyst to facilitate the reaction between the epoxy compound and the hardener/curing agent used, a diluent or solvent, other resins such as a phenolic resin that can be blended with the first and second epoxy resins of the formulation, accelerators, pigments, stabilizers, plasticizers, catalyst de-activators, flame retardants, wetting agents, rheology modifiers, other similar additives/components used in epoxy applications, and/or mixtures thereof.

Composition

The preparation of the curable formulation, and/or any of the stages thereof, may be a batch process or a continuous process. The mixing equipment used in the process may be any vessel and ancillary equipment known to those skilled in the art.

The process for preparing a curable composition includes admixing (a) the blended epoxy resin component with the toughening agent described above; (b) at least one amine curing agent; and (c) optionally, any other optional additive(s) such as at least one cure catalyst and/or other optional ingredients (e.g., as described above) as needed. For example, the preparation of the curable resin formulation may be achieved by blending, in mixing equipment known to one skilled in the art, the blended epoxy resin component, the curing agent, and optionally any other desirable additive(s). The optional additives such as a curing catalyst may be added to the composition during the mixing or prior to the mixing to form the curable composition.

The components of the curable composition may be mixed and dispersed at a temperature enabling the preparation of an effective curable epoxy resin composition having the desired balance of properties for a particular application (e.g., a coating application described herein). For example, the temperature during the mixing of the components may be from approximately 0° C. to approximately 80° C. and/or from approximately 10° C. to approximately 50° C., depending on the embodiment. Lower mixing temperatures may help to minimize/reduce reaction of the epoxide and hardener in the composition to maximize the pot life of the composition.

The curable composition may advantageously exhibit improved properties, such as low viscosity and rapid dry time. For example, the viscosity of the curable composition may be less than approximately 40 Pa*s at room temperature (about 25° C.), from approximately 1 Pa*s to approximately 35 Pa*s, from approximately 2 Pa*s to approximately 30 Pa*s, from approximately 3 Pa*s to approximately 25 Pa*s, from approximately 4 Pa*S to approximately 20 Pa*s, and/or from approximately 5 Pa-s to approximately 15 Pa-s, depending on the embodiment.

The curable composition may be cured to form a thermoset or cured composition such as a film coating on a substrate. The process of curing of the curable composition may be carried out at a predetermined temperature and for a predetermined period of time sufficient to cure the composition. The curing process may be dependent on the hardeners used in the formulation. For example, the temperature of curing the formulation may be from approximately −10° C. to approximately 200° C., from approximately 0° C. to approximately 100° C., and/or from approximately 5° C. to approximately 75° C., depending on the embodiment. Further, a dry through time may be chosen between approximately 1 hour to approximately 48 hours, between approximately 2 hours to approximately 24 hours, and/or between approximately 4 hours to approximately 12 hours, depending on the embodiment. In is theorized that below a period of time of less than approximately 1 hour, the time may be too short to ensure sufficient time for mixing and application under conventional processing conditions, and above approximately 48 hours, the time may be too long to be practical or economical.

Coating

The cured product (e.g., the cross-linked product made from the curable composition) may show improved properties over conventional epoxy cured resins. For example, the cured coating product may advantageously exhibit improved impact resistance, flexibility, and/or abrasion resistance.

According to exemplary embodiments, the epoxy composition is used to form an epoxy based coating that exhibits excellent flexibility and impact resistance. In exemplary embodiments, the coating derived from the epoxy composition may have an impact resistance of greater than 50 inch/lbs for direct impact and greater than 10 inch/lbs for indirect impact at a temperature of 25° C. (dependent on the overall thickness). For example, at a thickness of 4 mils, the direct impact resistance may be at least 140 inch*lbs and the indirect impact resistance may be at least 30 inch*lbs. Accordingly, the resultant coatings may be used as protective coatings such as abrasion resistance coatings. Abrasion resistant coatings may provide a sacrificial protective layer between the abrasive environment and the coated surface (e.g., the coated surface of processing equipment). As long as the coating remains intact, the equipment surface is protected from abrasive media and expensive repair or replacement may be avoided.

While protective coatings are known, improvements are sought because coatings wear relatively easily and may require frequent replenishment in order to reduce the possibility of and/or prevent damage to a coated surface. As such, there is a need/desire for a protective coating material that provides improved, long-term abrasion resistance under a variety of use conditions. Accordingly, embodiments discussed herein are related to epoxy resin based coatings for corrosion protection of metal substrates and can also be used in composites and civil engendering applications (e.g., filament winding and concrete coatings, respectively).

Unless indicated otherwise, all parts and percentages are by weight.

EXAMPLES

Urethane Acrylate Synthesis

Urethane acrylates are prepared with both DMC and KOH catalyzed polyols via the process described below, in which firstly a prepolymer is synthesized and secondly an acrylate capping procedure is performed on the resultant prepolymer.

In the urethane acrylate synthesis, the materials principally used are the following:

Isocyanate

A monomeric toluene diisocyanate, i.e., TDI, blend, having approximately 80 wt % of the 2,4 isomer of TDI and approximately 20 wt % of the 2,6 isomer of TDI (available from The Dow Chemical Company as VORANATE™ T-80).

DMC Polyol

A polypropylene based diol, having a molecular weight of approximately 4000 g/mol and a degree of unsaturation of approximately 0.007 milliequivalence/gram of polyol (available from The Dow Chemical Company as VORANOL™ LM 4000).

KOH Polyol

A polypropylene based diol, having a molecular weight of approximately 4000 g/mol and a degree of unsaturation of approximately greater than 0.14 milliequivalence/gram of polyol available from The Dow Chemical Company as VORANOL™220-028).

Acrylate

A hydroxyethyl acrylate (HEA) hydroxyalkyl ester monomer based solution including at least about 95 wt % of HEA (available from The Dow Chemical Company as ROCRYL™ 420).

Prepolymer 1 synthesis using DMC catalyzed polyol: Isocyanate (approximately 75 grams) and DMC Polyol (approximately 827 grams) are charged to a dry 2 liter 4-neck round bottom flask equipped with overhead stirring, temperature control probe, addition funnel, and nitrogen inlet. The reactor is heated to 80° C. and a drop of dibutyltin dilaurate is added. The reaction is stirred for approximately 2 hours. The final NCO content is approximately 2% as determined by titration.

Acrylate capping of Prepolymer 1: The acrylate (approximately 54.3 grams) is added to the resultant Prepolymer 1 (approximately 881 grams) from above, and the reaction is stirred at 45° C. for 2 hours. Residual isocyanate is observed by FT-IR (~2250 cm$^{-1}$). An additional drop of dibutyltin dilaurate is added and stirring is continued for an additional 2 hours, after which time there was no NCO stretch as observed by FT-IR analysis (i.e., there is no observable excitation mode for that isocyanate functional group in the FT-IR analysis such that NCO stretch is equal to absorbance when using FT-IR analysis). The resultant material is referenced as DMC Urethane Acrylate.

Prepolymer 2 synthesis using KOH catalyzed polyol: Isocyanate (approximately 75 g) and KOH Polyol (approximately 827 g) are charged to a dry 2 liter 4-neck round bottom flask equipped with overhead stirring, temperature control probe, addition funnel, and nitrogen inlet. The reactor is heated to 80° C. and a drop of dibutyltin dilaurate is added. The reaction is stirred for approximately 2 hours. The final NCO content is approximately 2 wt %, as determined by titration.

Acrylate capping of Prepolymer 2: The acrylate (approximately 54.3 grams) is added to the resultant Prepolymer 2 (approximately 881 grams) from above, and the reaction is stirred at 45° C. for 2 hours. Residual isocyanate is observed by FT-IR (2250 cm-1). An additional drop of dibutyltin dilaurate is added and stirring is continued for an additional 2 hours, after which time there was no NCO stretch as observed by FT-IR analysis. The resultant material is referenced as KOH Urethane Acrylate.

Evaluation of Properties

In the formation of epoxy formulations, the materials principally used are the following:

Bisphenol F Epoxy A liquid epoxy resin that is an unmodified bisphenol F based liquid, which is low viscosity epoxy resin (available from The Dow Chemical Company as D.E.R.™354).

Bisphenol A Epoxy A liquid epoxy resin that is a reaction product of epichlorohydrin and bisphenol A (available from The Dow Chemical Company as D.E.R.™331).

Hardener A modified cycloaliphatic amine, having an amine hydrogen equivalent weight of approximately 112 gram/equivalence (available from The Dow Chemical Company as D.E.H.™ 530).

The following formulations are used to prepare coating samples:

TABLE 1

|  | Working Example 1 (wt %) | Comparative Example A (wt %) | Comparative Example B (wt %) | Comparative Example C (wt %) | Comparative Example D (wt %) | Comparative Example E (wt %) |
| --- | --- | --- | --- | --- | --- | --- |
| DMC Urethane Acrylate | 10.0 | — | — | — | — | 10.0 |
| KOH Urethane Acrylate | — | — | — | 10.0 | 10.0 | — |
| Bisphenol F Epoxy | 6.6 | — | 7.4 | 6.6 | — | — |
| Bisphenol A Epoxy | 48.8 | 33.6 | 54.5 | 48.8 | 55.6 | 55.5 |
| Hardener | 34.6 | 66.4 | 38.1 | 34.6 | 34.4 | 34.5 |

The components in the formulations show above with respect to Table 1, are weighed, provided in a Flacktek cup, and mixed at room temperature in a speed-mixer at 2400 rpm for 120 seconds. The contents of the cup are coated onto a phosphate treated metal panel with doctor blade with nominal gap of 15 mils. The resultant coatings are cured for 7 days at room temperature (approximately 23° C.) to provide a final cured thickness ranging from 4 to 6 mils.

Impact resistance measurements with respect to the resultant coatings are performed with a BYK-Gardner impact tester that utilizes a four pound weight. Testing is performed on both the front side of the coated panel (direct) and the reverse uncoated side (indirect). Failure is defined as delamination, crazing, or tearing of the coating. Passing results are reported in inch*lbs. The resultant measurements with respect to impact resistance for both direct and indirect impact at 25° C. are shown in FIG. 1 for Working Example 1 and Comparative Examples A to E, at a sample thickness of 4 mils. Working Example 1 exhibits a significantly higher impact resistance for both direct and indirect testing, in particular approximately 160 inch*lbs for direct impact and 40 inch*lbs for indirect impact. Comparative Examples A and B, which do not include an acrylate, exhibit significantly inferior direct and indirect impact resistance in comparison to Working Example 1. Further, Comparative Examples C and D, which include the KOH Urethane Acrylate, exhibit significantly inferior indirect impact resistance of 0 inch*lbs, in comparison to Working Example 1 and Comparative Examples A, B, and E, and significantly inferior direct impact resistance of 20 inch*lbs in comparison to Working Example 1. Also, with respect to Working Example 1 and Comparative Example E, it is shown that both direct and indirect impact resistance are improved with the inclusion of both the Bisphenol F epoxy and the DMC Urethane Acrylate.

The invention claimed is:

1. A curable composition, consisting essentially of:
(A) a first component consisting essentially of:
from 5.0 wt % to 20.0 wt %, based on the total weight of the first component, of a toughening agent component including a Bisphenol F based epoxy resin and an urethane acrylate component, the Bisphenol F based epoxy resin being present in an amount from 30.0 wt % to 45.0 wt % and the urethane acrylate component being present in an amount from 50.0 wt % to 70.0 wt %, based on the total weight of the toughening agent component, the Bisphenol F based epoxy resin including only liquid epoxy resins, the urethane acrylate component including the capping reaction product of an acrylate and an isocyanate-terminated prepolymer, the isocyanate-terminated prepolymer being the reaction product of a polyisocyanate and at least a DMC derived polyol having a molecular weight of at least 3000 g/mol and a degree of unsaturation that is less than 0.100 meq/g polymer;
a hardener component that includes at least one amine based hardener and is present in a ratio of 0.8 to 1.2, based on a number of equivalents of amino hydrogen groups in the hardener component to a number of equivalents of reactive groups in the first component capable of forming a covalent link with the amine reactive groups in the hardener; and
an epoxy base component that accounts for a remainder of the total weight of the first component and that includes at least one epoxy resin separately provided from the Bisphenol F based epoxy resin;
(B) an optional second component consisting essentially of at least one of a filler, wherein the Bisphenol F based epoxy resin is a liquid epoxy resin that is an unmodified bisphenol F based liquid.

2. The curable composition as claimed in claim 1, wherein the epoxy base component is different from the Bisphenol F based epoxy resin.

3. The curable composition as claimed in claim 1, wherein the urethane acrylate accounts for less than 70 wt % of the total weight of the toughening agent component.

4. The curable composition as claimed in claim 1, wherein the polyisocyanate is a monomeric isocyanate having a nominal isocyanate functionality of at least 2.

5. The curable composition as claimed in claim 1, wherein the Bisphenol F based epoxy resin and the urethane acrylate component are pre-blended prior to mixing with the epoxy base component and the hardener component to form a layer.

6. The curable composition as claimed in claim 1, wherein the Bisphenol F based epoxy resin, the urethane acrylate component, and at least one of the hardener component and the epoxy base component are mixed at a same time to form a layer.

7. The curable composition as claimed in claim 1, wherein the optional second component is present and accounts for 5 wt % to 70 wt % of a combined weight of the first component and the second component.

8. An anti-corrosion coating that is a cured product of the curable composition as claimed in claim 1.

9. An impact resistant coating that is a cured product of the curable composition a claimed in claim 1.

10. The curable composition as claimed in claim 1, wherein the epoxy base component accounts for 20 wt % to 80 wt % of the total weight of the first component and includes at least a Bisphenol A based epoxy resin.

11. The curable composition as claimed in claim 1, wherein the DMC derived polyol accounts for at least 75 wt % of a polyol component from which the isocyanate-terminated prepolymer is formed for the urethane acrylate component.

12. The curable composition as claimed in claim 1, wherein the epoxy base component consists essentially of a Bisphenol A based epoxy resin.

* * * * *